United States Patent [19]

Guggiari

[11] Patent Number: 5,073,102

[45] Date of Patent: Dec. 17, 1991

[54] DIE PLATE FOR EXTRUSION, WITH DISCHARGE HOLES EQUIPPED WITH FITTED INSERTS

[75] Inventor: Andrea Guggiari, Como, Italy

[73] Assignee: Pomini Farrel S.P.A., Castellanza, Italy

[21] Appl. No.: 620,540

[22] Filed: Nov. 29, 1990

[30] Foreign Application Priority Data

Dec. 15, 1989 [IT] Italy ................. 22709 A/89

[51] Int. Cl.$^5$ ............................................. B29C 47/00
[52] U.S. Cl. ................................... 425/461; 425/467; 425/DIG. 58
[58] Field of Search ............... 425/461, 466, 467, 190, 425/DIG. 58, 192 S

[56] References Cited

U.S. PATENT DOCUMENTS

| | | | |
|---|---|---|---|
| 2,058,032 | 10/1936 | Murphy | 425/467 |
| 3,397,427 | 8/1968 | Burke, Jr. et al. | 425/467 |
| 3,947,172 | 3/1976 | Myers | 425/467 |
| 4,354,989 | 10/1982 | Beach | 425/467 |
| 4,396,366 | 8/1983 | Kessler et al. | 425/467 |
| 4,445,838 | 5/1984 | Groff | 425/467 |
| 4,480,977 | 11/1984 | Nazem | 425/467 |
| 4,563,140 | 1/1986 | Turecek | 425/467 |

FOREIGN PATENT DOCUMENTS

| | | | |
|---|---|---|---|
| 649517 | 8/1937 | Fed. Rep. of Germany | 425/467 |
| 721055 | 3/1980 | U.S.S.R. | 425/467 |
| 849840 | 9/1960 | United Kingdom | 425/467 |

Primary Examiner—Jay H. Woo
Assistant Examiner—C. Scott Bushey
Attorney, Agent, or Firm—Herbert Dubno

[57] ABSTRACT

The plate for extrusion, having discharge holes equipped with fitted inserts, in which the discharge holes each possess a seating having a circular base surface and an outlet opening at the surface of the plate having a substantially elliptical outline, the major axis of the ellipse being equal to the diameter of the base surface, an insert being fitted in the seating which possesses a base surface, facing towards the inside of the plate, having a substantially elliptical outline which can be inscribed, with slight clearance, inside the opening of the seating, and having an opposite surface, facing towards the outside of the plate, having a circular outline with its diameter equal to the minor axis of the base.

5 Claims, 1 Drawing Sheet

DIE PLATE FOR EXTRUSION, WITH DISCHARGE HOLES EQUIPPED WITH FITTED INSERTS

FIELD OF THE INVENTION

The subject of the present invention is a die plate for extrusion having discharge holes equipped with fitted inserts, axially locked in a predetermined position.

BACKGROUND OF THE INVENTION

For the production of granules of plastics material and similar products, the material brought into the plastic state is extruded in the form of threads, cut after extrusion into small cylindrical portions by means of rotating blades in contact with the die.

For carrying out such an operation, an extruder is filled suitable for plasticizing the material to be formed into granules, a die plate having a plurality of holes adapted for forming the aforementioned threads.

For the purpose of preventing the holes of the guide plate from being subjected to wear, as a consequence of the abrasion of the extruded material and due to the scraping of the blades, these holes are equipped with inserts of a material of high hardness, for example tungsten carbide, usually secured to the plate by braze welding.

This fixing technique, however, is not always capable of assuring the required locking effect, thus making possible detachment of an insert from its seating during working as a consequene of its axial pulling-out caused by the friction of the extruded material.

It is also possible to secure the inserts in the associated seatings by screwing or the like, but this requires tiresome additional operations, which make the construction of the die plate excessively expensive and, in particular, require excessive length of the final extrusion holes.

OBJECTS OF THE INVENTION

It is, therefore, a principle object of the present invention to provide a die plate with fitted inserts axially locked in such a manner as to resist the working loads, in particular without requiring the brazing material to be subjected to high loadings. Still another object of the invention is to provide a die having moderate axial dimensions, reducing the production cost.

SUMMARY OF THE INVENTION

These results are achieved by the present invention, which describes a die plate for extrusion, having one or more discharge holes for material equipped with fitted inserts, in which, in correspondence with each discharge hole for material a hollow seating is present coaxial with the hole and equipped with at least one undercut portion is present. The seating has an outlet opening at the surface of the plate with different dimensions in two directions at an angle with each other and receives an insert having a base surface, facing towards the interior of the plate, with dimensions different in two directions at an angle to each other, and capable of being inscribed in the opening of the seating. The base surface of the insert has a dimension, in one axial plane, greater than the opposite surface in the same plane, the larger dimension of the base surface of the insert is disposed in correspondence with the smaller dimension of the opening of the seating.

According to a preferred embodiment, the seating in the die plate has a circular base surface and the outlet opening at the surface of the plate has a substantially elliptical outline with its major axis equal to the diameter of the base surface, and the insert has a base surface, facing towards the interior of the plate, having a substantially elliptical outline, capable of being inscribed with small clearance inside the opening of the seating, and an opposite surface, facing towards the outside of the plate, having a circular outline with its diameter equal to the minor axis of the base.

The insert is mounted in the seating with the major axis of its base perpendicular to the major axis of the opening. The insert and seating have a free space therebetween filled with makeup material by brazing.

BRIEF DESCRIPTION OF THE DRAWING

The above and other objects and features will become more readily apparent from the following description, reference being made to.

DESCRIPTION

Figure 1:
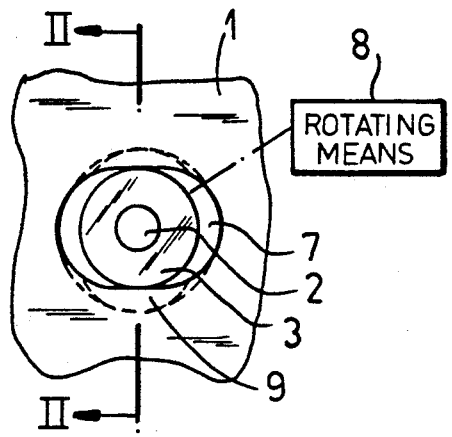
FIG. 1 is a front view of a portion of the die plate according to the invention.
Figure 2:
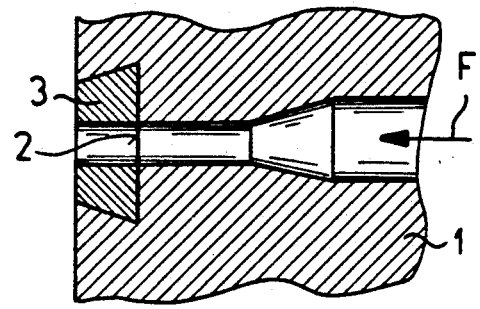
FIG. 2 is a section on the plane II—II of FIG. 1.

As FIGS. 1 and 2 show, in a die plate 1 of an extrusion head, each nozzle 2 is equipped with an insert 3 of hard material, adapted for resisting the wear caused by the passage of the extruded material, which flows in the direction of arrow F shown in FIG. 2.

Figures 4, 5:
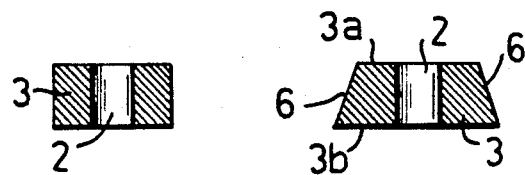
FIG. 4 is a sectional view along line IV—IV in FIG. 3.
FIG. 5 is a sectional view along V—V in FIG. 3.
Figure 3:
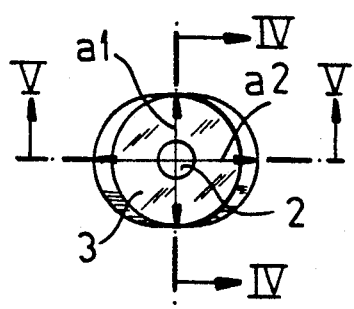
FIG. 3 is a front view of an insert for the plate of FIG. 1.

The insert 3 is more readily visible in FIGS. 3, 4 and 5 and has its upper base 3a intended to face towards the outside of the plate 1 and being of a circular shape, whereas the lower base 3b has a substantially elliptical form, with its minor axis a1 equal to the diameter of the base 3a and its major axis a2 greater than this value, so as to define a trapezoidal shape of the insert along a plane containing the axis a2 as shown in FIG. 5, and a rectangular form along a plane containing the axis a1 shown in FIG. 4.

Figure 7:
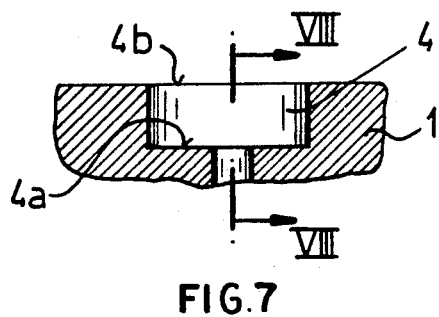
FIG. 7 is a sectional view along line VII—VII in FIG. 6.
Figure 6:
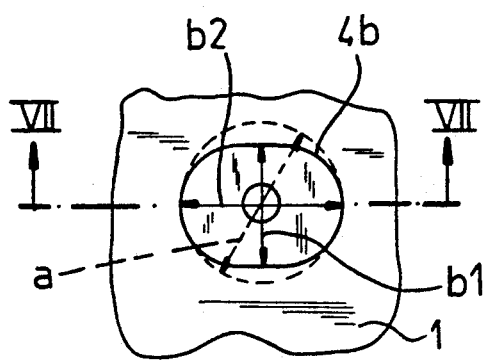
FIG. 6 is a front elevational view of the die plate.
Figure 8:
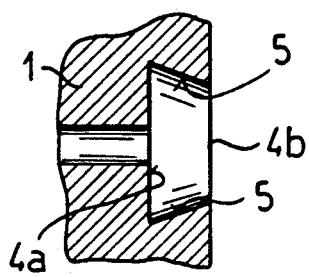
FIG. 8 is a sectional view along line VIII—VIII in FIG. 6.

The plate 1, in turn, has a seating 4, shown in FIGS. 6, 7 and 8, which has a base surface 4a of circular shape and having a diameter d equal to or slightly greater than the value of the major axis a2 of the insert 3.

The profile of the opening 4b of the seating 4, at the surface of the plate 1, has a substantially elliptical shape with its minor axis b1 equal to or slightly greater than the axis a1 of the insert, and its major axis b2 equal to or slightly greater than the axis a2.

This means that the base 3a of the insert has an outline substantially equal to that of the opening 4b, and that the seating 4 possesses, in the plane containing the axis b1, a re-entrant profile having generatrices 5 of undercut shape, having the same inclination as the generatrices 6 of the insert 3 in the plane containing the axis a2 or its base.

With the construction described, it is therefore possible to introduce the insert 3 into the seating 4 by arranging the corresponding axes a1 and b1, and a2 and b2, of the insert and seating respectively, parallel to each other.

When the insert 3 is arranged inside the seating 4 it can be rotated through 90°, as made possible by the circular profile of the base surface 4a, arranging thereby the insert in a position in which it cannot escape axially from the seating and remains secured in the seating by engagement of its generatrices 6 with the generatrices 5 of the seating.

The insert 3, after the aforementioned rotation through 90°, is held firmly in the position adopted by filling the zones 7, left free between the insert and the seating, with make-up material 9 by brazing. In this way, the insert can no longer be withdrawn from the seating, but nevertheless without the axial loadings to which the insert itself is subjected being able to act upon the brazing material, this material having solely the function of preventing accidental rotations of the insert out of its secured position.

The rotation of the insert 3 in the seating 4, in the installation phase, can be carried out by friction or by means of suitable gripping means 8, of any form, arranged for this purpose on the surface 3a of the insert 3. The periphery of the opening 4b of the seating 4 and of the base 3b of the insert 3 is, preferably, elliptical for convenience in machining, but it may also be of a different shape. Nevertheless having a dimension in one direction different from that one of another direction at an angle to the first for the purpose of allowing the rotation through the angle corresponding to the passage from the position of insertion, which allows axial sliding of the insert into the seating, into the position of locking, at least a portion of the base surface 4a should have a circular periphery, with a radius equal to the maximum dimensions, of the base of the insert with respect to the axis.

Numerous variants of the structure as described may be introduced, without however departing from the scope of the invention in its general characteristics.

I claim:

1. An apparatus for extruding a material, said apparatus comprising:
    a die plate formed with spaced apart inner and outer sides;
    at least one discharge hole centered on a hole axis and extending through said plate between said inner and outer sides;
    a seat surrounding said hole and coaxial therewith; and
    an insert mounted in said seat, said insert being formed with:
        a base surface perpendicular to said hole axis having a longitudinal dimension in a first direction and a transverse dimension in another direction angularly offset from said first direction about said hole axis, and
    an outer surface parallel to and spaced axially outward from said base surface, said outer surface having a smaller dimension in said first direction than said longitudinal dimension of said base surface, said insert being axially insertable into said seat, said seat being formed with:
        an inner surface spaced axially inward from said outer side of said plate and having a dimension in said first direction sufficient for receiving said base surface of the insert, and
        a peripheral surface extending axially outwardly from said inner surface and meeting said outer side of said plate at an outer edge defining an opening having a dimension in said first direction at least equal to said longitudinal dimension of said base surface and a dimension in a second direction at least equal to said transverse dimension of said base surface but less than said longitudinal dimension of said base surface, said peripheral surface having an undercut region accommodating said base surface in a locking angular position of said insert wherein said longitudinal dimension of said base surface is angularly offset from said second direction and axially arresting said insert in said seat in said angular position.

2. The apparatus defined in claim 1 wherein said inner surface of said seat is circular and said outer edge has substantially elliptical shape, said outer surface of said insert member being circular and having a respective diameter equal to said dimension in said minor direction of said opening and said inner surface being elliptical, said outer surface of said insert and said peripheral surface forming a small clearance therebetween in said locking position of said insert in said seat.

3. The apparatus defined in claim 1 wherein said locking angular position is offset at 90° from said major direction.

4. The apparatus defined in claim 2 wherein said clearance is filled with a filling material upon brazing for preventing rotation of said member in said locking position.

5. The apparatus defined in claim 1 wherein said insert further comprises gripping means for imparting said rotation.

* * * * *